United States Patent Office 3,359,730
Patented Dec. 26, 1967

3,359,730
FLUID-RESERVOIR ASSEMBLY
Hans Schanz, Frankfurt am Main, Germany, assignor to Alfred-Teves, Maschinen- und Armaturenfabrik KG., Frankfurt am Main, Germany, a firm of Germany
Filed Oct. 4, 1965, Ser. No. 492,798
3 Claims. (Cl. 60—54.6)

ABSTRACT OF THE DISCLOSURE

Brake-fluid reservoir having an upwardly extending neck remote from the brake master cylinder, to which the reservoir is connected by a threaded nipple, and a cap threaded onto the neck to clamp a bellows exterially of the reservoir into sealing engagement therewith, the cap having an aperture connecting the interior of the bellows with the interior of the reservoir. A lightweight plastic valve member is carried by the other end of the bellows and is spring loaded into a closed position to normally block entry of air and contaminants entrained thereby into the bellows until the bellows collapses with decrease in the level of brake fluid and the valve is opened by engagement with the cap.

---

Figure 1:
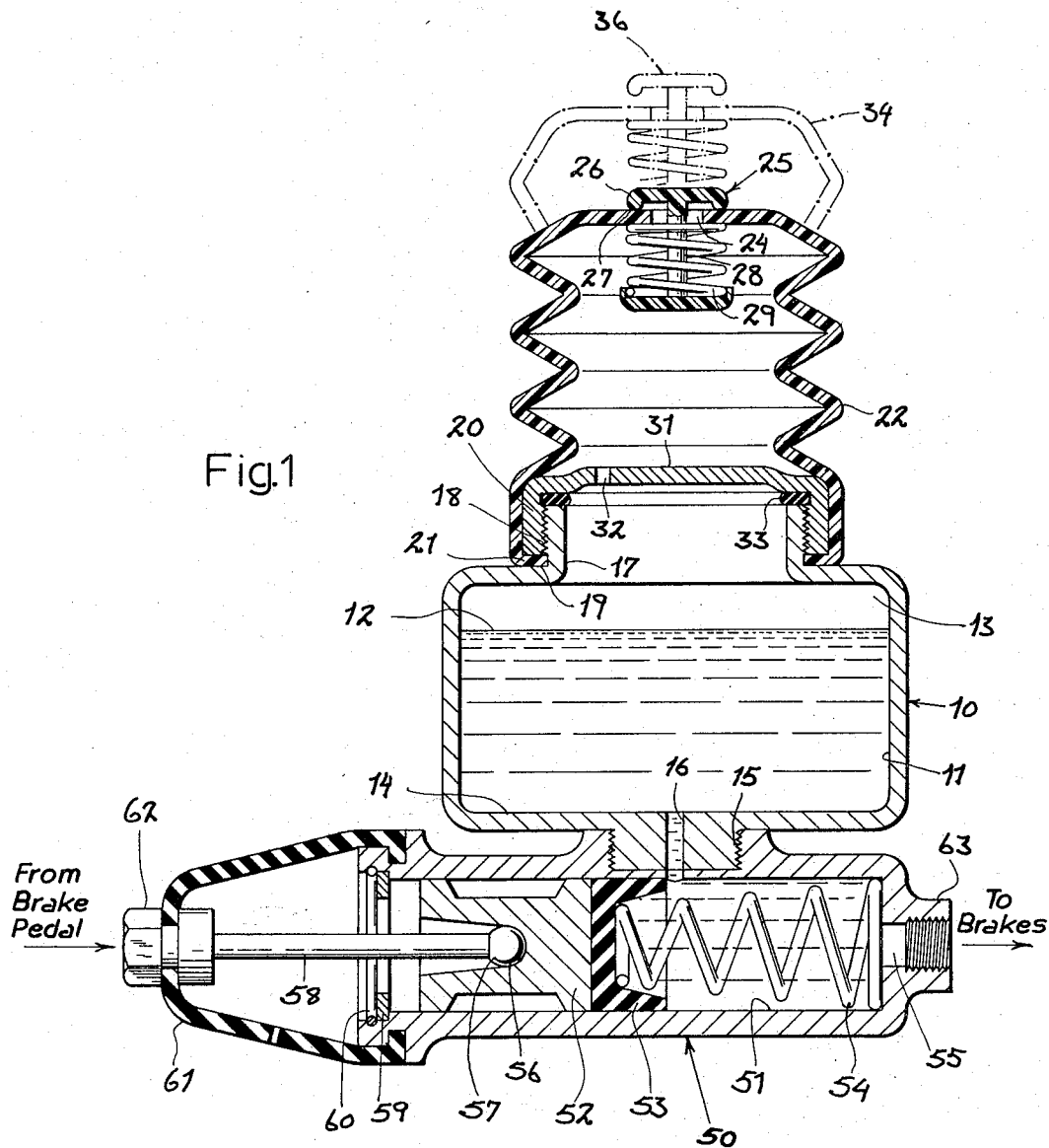

My present invention relates to fluid-reservoir assemblies and, more particularly, to improvements in fluid reservoirs of the type used to permit dispensing of liquid without excessive contact with ambient impurities. The assembly of the present invention is, moreover, especially designed for use in conjunction with the master cylinders of hydraulic brake systems and like devices.

In hydraulic brake systems, it has been proposed heretofore to provide a master cylinder wherein a piston is mechanically displaceable, e.g. via a brake pedal, to force a hydraulic brake fluid into one or more wheel cylinders designed to shift respective brake shoes against a rotary brake element. Hydraulic brake systems of this type can include drum-type or internal-expending brakes in which the brake shoes are forced outwardly against a brake drum, or disk-type brakes in which one or more brake shoes are urged axially against a brake disk constituting the rotary element. The master cylinder of such brake systems usually includes a brake-fluid reservoir provided with a breathing cap or the like designed to impede access of gross impurities to the interior of the fluid reservoir while permitting the admission of air to replace hydraulic fluid drawn into the master cylinder. Upon termination of the braking operation, hydraulic fluid usually returns to the reservoir so that the liquid level therein fluctuates to a significant extent during operation of the brake. It has been proposed heretofore to provide an expandable chamber within the mouth of the fluid reservoir to compensate for such fluctuation in the liquid level and permit such fluctuations without, however, permitting entry of air-entrained impurities to any significant extent. It is especially desirable, in this connection, to bar entry of water vapor in the form of humid air since such vapor modifies the volatility of the brake fluid and can give rise to gas bubbles in the hydraulic lines. Conventional systems of this character have, however, an important disadvantage inherent in the arrangement of the expandable chamber in the mouth of the fluid reservoir. This disadvantage is the relatively small volume of the gas chamber which is substantially entirely accommodated within the neck of the mouth of the vessel.

It is the principal object of the present invention, therefore, to provide an improved liquid-reservoir assembly for a system adapted to dispense liquid whereby the liquid therewithin can sustain fluctuations in level.

A more specific object of this invention provides a reservoir for the brake fluid of the master cylinder of a vehicular brake system which is capable of preventing excessive transfer of impurities such as water vapor from the ambient atmosphere to the liquid.

These objects and others which will become apparent hereinafter are attained, in accordance with the present invention, with a liquid-storage assembly which comprises a receptacle communicating with the dispensing device, i.e. the master cylinder of the brake system, containing the liquid and sustaining fluctuations in the liquid level; a bellows-type casing of elastically deformable material expandable and contractable upon fluctuation of the liquid level and consequent changes in the internal pressure within the gas compartment formed by the bellows; and a valve means on the casing which is normally closed during fluctuations of the liquid level and changes in the volume of the gas compartment within a predetermined range, but which is designed to open upon excessive contraction to connect the gas compartment with the atmosphere and thereby permit return of the bellows to its normal position via the inherent elasticity of the bellows.

I have found that this arrangement should include a valve means whose valve member is composed of lightweight material, preferably a synthetic resin, and is engageable with a cap mounted on the neck of the receptacle upon axial contraction of the bellows beyond the predetermined range. The bellows surrounds the neck of the receptacle and thus can have a volume substantially larger than the volumes of the expandable chambers used heretofore and is advantageously mounted upon the receptacle by the cap. I have found, moreover, that the use of such valve means is important since the bellows returns substantially completely to its normal position in spite of the fact that such return tends to close the valve as the valve member is withdrawn from engagement with the cap. This appears to be a consequence of the inertia of the valve which prevents instantaneous closure and the rapidity with which the bellows elastically returns to its normal position.

According to another feature of this invention, the valve means includes a spring holding the valve in a closed condition and dimensioned to permit opening of the valve upon the development of a gas pressure in excess of that corresponding to a rise in the liquid level to the maximum of the predetermined range of permissible variation. It has been observed that this arrangement permits equalization of the pressures inside and outside the bellows only when such equalization is essential without, however, permitting excessive introduction of air and humidity. The system incorporating such an assembly does not experience any change in the vaporization temperature of the brake fluid.

Figure 2:
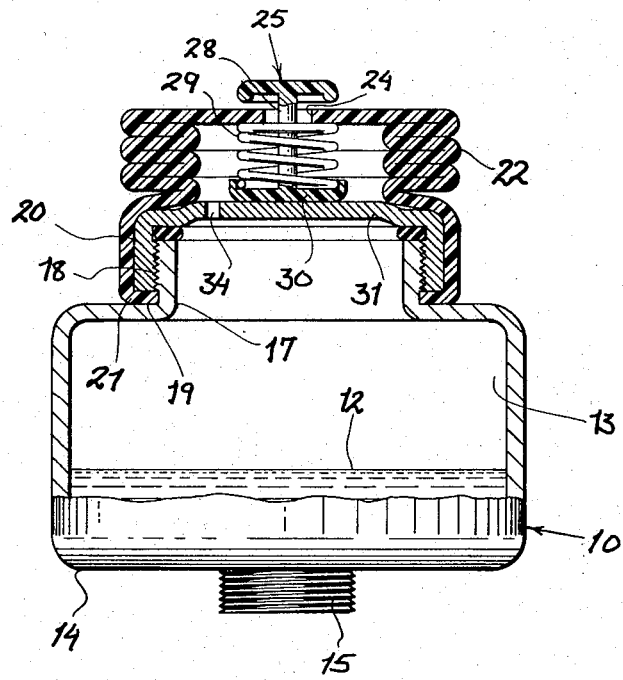

The above and other objects, features and advantages of the present invention will become more readily apparent from the following description, reference being made to the accompanying drawing in which:

FIG. 1 is a vertical cross-sectional view through a liquid-storage reservoir assembly according to this invention mounted upon a master cylinder of a hydraulic brake system; and FIG. 2 is a fragmentary axial cross-sectional view through the assembly thereof showing the latter in a further operative position.

From the drawing, it will be seen that a hydraulic brake system, especially for disk-type wheel brakes but also adapted to use conventional internally-expanding or drum-type wheel brakes, can be provided with a master cylinder 50 whose cylinder bore 51 receives a slidable piston 52. The latter is provided with a sealing member 53 of an elastomeric material and is reciprocable against the force of a restoring spring 54 to drive hydraulic fluid through an outlet 55 at one end of the bore to the wheel-brake cylinders. For this purpose, the wheel-brake cylinders are coupled via the usual hydraulic transmission lines (not shown) with a fitting 63 on the master cylinder 50. Hydraulic fluid is delivered to the cylinder bore 51 from a reservoir assembly 10, 22, to be described in greater detail hereinafter. It may be noted, however, that a threaded nipple 15 of this assembly is provided with a bore 16 through which hydraulic fluid can pass into the interior of the master cylinder; this bore is blocked upon the displacement of the piston 52 to the right (FIG. 1) in the usual manner whereupon the hydraulic fluid is forced into the transmission lines and the wheel-brake cylinders.

The piston 52 is formed with a spherical seat 56 for the ball-shaped head 57 of a force-transmitting rod 58 whose other extremity 62 is connectable by the usual mechanical linkage with a brake pedal or similar actuator. The left-hand extremity of the cylinder bore 51 is closed by a rubber sleeve 61 which is vented so that there can be no buildup of pressure within the sleeve but which prevents dust and other impurities from entering the master cylinder. A stop 59, held in place by a split ring 60, prevents excessive displacement of the piston 52 to the left.

Essentially, the afore-described structure of the master cylinder is conventional and is illustrated only to demonstrate the relationship between the reservoir assembly and the fluid-dispensing device constituted by the master cylinder. It will be apparent that operation of the brake pedal and the piston 52 will result in fluctuations in the level of liquid within the reservoir assembly 10, 22, and hydraulic fluid is forced by the master cylinder to the wheel brakes and is returned therefrom. Sudden leakages of the brake fluid, resulting, for example, from defective seals or connections in the system, will give rise to sudden and severe drops in the liquid level within the reservoir assembly. The development of gas bubbles in the fluid-transmission lines or the wheel cylinders or return of fluid therefrom will cause the hydraulic fluid to back up into the resrvoir and produce increases in the liquid level. Such fluctuations must be permitted without excessive introduction of impurities such as water vapor into the brake fluid.

The reservoir assembly of the present invention, which is suitable for use with any liquid dispenser having requirements similar to those of the master cylinder disclosed above, comprises a receptacle 10 forming a chamber 11 for the liquid whose level within this chamber is indicated at 12. The receptacle 10 is connected via a passage, namely, the bore 16 of the nipple 15 by which the receptacle is attached to the cylinder 50, whereby the brake fluid is supplied to the bore of the master cylinder. Whereas prior-art expandible-chamber devices for permitting fluctuation of the liquid level have generally been accommodated within the neck of the liquid-storage vessel and have, accordingly, been of relatively small capacity, I have found that the disadvantages arising from the conventional arrangements can be totally eliminated when the expandable chamber forms a bellows 22 of inherently elastically deformable material which is mounted externally of and surrounds the neck 17 of the mouth of the reservoir. This arrangement greatly increases the volume of the expandible chamber and affords other advantages which will become more readily apparent hereinafter. The bellows 22, whose rest position is illustrated in solid lines in FIG. 1, has an inwardly turned bead 21 at its lower or open end which constitutes a seal and is clamped between the closure cap 20 of the receptacle 10 and a seat 19 formed on this receptacle around the neck 17; the latter is threaded at 18 to receive the cap 20.

I have found it to be highly advantageous to provide the bellows with a valve means openable upon extreme fluctuation of the volume of the gas compartment formed within the bellows by the wall 31 of cap 20. Thus, upon extreme contraction of the bellows, the valve means will open to permit air to enter the chamber and restore the original operating mode of the device. Furthermore, excessive expansion of the volume of the bellows will result in a corresponding opening of the valve to discharge gas. The valve means generally designated 25, is constituted by a lightweight valve plate 26 overlying the upper wall 23 of the bellows and is preferably composed of a synthetic resin. The valve plate 26 has an annular rim 27 surrounding an opening 24 in this upper wall and is sealingly engageable with the latter to prevent flow of air into or out of the bellows through this aperture. The valve member is formed integrally with a stem 28 extending through the aperture 24 having a flange 30 constituting a seat for a coil spring 29 which bears upon the underside of wall 23 and surrounds the stem 28. The spring 29 thus holds the valve plate 26 against the bellows to close the aperture 24. A port 32 in the cap 20 communicates between the gas compartment of the bellows and the gas compartment 13 above the liquid within the receptacle 10. A rubber washer or other seal 33 can be provided between the mouth of neck 17 and the cap 20 to prevent air leaks.

During normal operation of the master cylinder, the liquid level 12 will fluctuate within a limited range resulting in a corresponding fluctuation in the volume of the bellows 22. Thus, as the liquid level in receptacle 10 rises, air from above the liquid is compressed and fed via port 32 into the bellows to expand the latter slightly; conversely, a reduction in the liquid level will cause a reduction in the pressure within compartment 13 and air will flow into this compartment through port 32 from the bellows so that the pressure in the latter will fall below atmospheric pressure. The bellows will then contract. During normal brake operation, therefore, the fluctuations in the liquid level are compensated by the bellows and the introduction of air and impurities is completely prevented.

When, however, there is a severe depletion of hydraulic fluid, resulting from leakage or excessive demand, the drop in the liquid level will exceed the predetermined permissible range for normal operation. Such a demand can develop from relatively small losses of liquid during normal operation and, upon exceeding a predetermined level corresponding to the distance between the lower portion 30 of the valve member and the cap 31, can give rise to a re-establishment of the normal operation mode of the bellows. Thus, when the liquid level sinks below a point corresponding to contact between the lower portion 30 of the valve member and the cap 20, the valve 25 will open (FIG. 2) to permit air to be drawn into the bellows. I have found that the natural inertia of the valve and the inherent elasticity of the bellows permits the latter immediately to return to its normal position (solid lines in FIG. 2) in spite of the fact that the valve member has been withdrawn from engagement with the cap. This re-establishment of the normal condition is substantially instantaneous.

Advantageously, the spring 29 is so dimensioned that, upon development of excessive pressure within the bellows, the valve plate 26 will be lifted and equilibrium with the ambient pressure restored. Thus, an increase in pressure within the bellows can result in an expansion thereof to the dot-dash position 34 shown in FIG. 1, the valve plate being shown in an open position by dot-dash lines 36. This latter operation of the valve has been found to be especially important to overcome disadvantages resulting from the development or evolution of gases from the brake fluid. While the brake fluid is designed to preclude the formation of gases under normal brake conditions, it has been observed in practice that air or gas is frequently given off and can produce an excessive pressure within the master cylinder or reservoir. This pressure excess is particularly undesirable when disk brakes are used since it can be sufficient to bring the brake shoes into contact with the disk and results in delayed release of the brake or extended braking operations beyond release of the actuator. Furthermore, such evolution of gases can give rise to the development of gas bubbles in the hydraulic system. By venting the excessive pressure to the atmosphere, all of these disadvantages can be eliminated. The valve assembly 25 has been found to be capable of admitting a controlled volume of air to the bellows so that the total moisture thereby brought into contact with the brake fluid can be held to a minimum.

I claim:

1. In a hydraulic brake system, in combination, a master brake cylinder adapted to supply a brake fluid to at least one wheel-brake cylinder; and a brake-fluid-reservoir assembly connectable with said master brake cylinder, said master brake cylinder being adapted to cause fluctuations in the level of brake fluid within said assembly, said assembly comprising a liquid-storage receptacle formed with a neck and containing said brake fluid, an elastically deformable bellows surrounding said neck and mounted externally on said receptacle while communicating therewith through said neck and defining an axially expandable and contractable gas compartment, a cap mounted on said neck for partitioning said compartment from said receptacle and provided with an aperture of relatively small cross-section relatively to that of the neck for communicating between said compartment and said receptacle, and normally closed valve means mounted on an end of said bellows remote from said receptacle and shiftable toward and away from said cap upon contraction and expansion of said bellows for preventing passage of air to and from said compartment upon fluctuation of the brake-fluid level in said receptacle within a predetermined range, said valve means including a valve member engageable with said cap upon contraction of said bellows in response to a fall of the brake-fluid level outside said range to connect said compartment with the ambient atmosphere and permit re-expansion of said bellows.

2. The combination defined in claim 1 wherein said cap is threadedly secured to the exterior of said neck, said bellows having a sealing bead clamped by said cap against said receptacle.

3. The combination defined in claim 2, further comprising a washer interposed between said neck and said cap, said receptacle being provided with a nipple at its lower extremity remote from said neck for connecting said assembly to said master brake cylinder, said valve member being integrally composed of a lightweight synthetic resin and having a valve plate overlying said end of said bellows provided with an aperture in annular engagement with said bellows around the aperture therein, a stem connected to said plate and extending through said aperture, a seat formed on said stem within said compartment and a spring bearing against said seat and the underside of the bellows for normally holding said plate in sealing engagement there with said wall, said seat being engageable with said cap upon contraction of said bellows.

References Cited

UNITED STATES PATENTS

| 725,782 | 4/1903 | Schmahl et al. | 220—44 X |
| 762,299 | 6/1904 | Fulton | 92—34 X |
| 2,952,128 | 9/1960 | Highland | 60—54.6 |
| 3,216,198 | 11/1965 | Brooks | 60—54.6 |
| 3,233,411 | 2/1966 | Schubert | 60—54.6 |

FOREIGN PATENTS

| 885,352 | 5/1943 | France. |
| 856,832 | 11/1952 | Germany. |

MARTIN P. SCHWADRON, *Primary Examiner.*

I. C. COHEN, *Assistant Examiner.*